United States Patent
Lin

(10) Patent No.: US 11,055,578 B2
(45) Date of Patent: Jul. 6, 2021

(54) METHOD FOR CLASSIFYING IMAGES AND ELECTRONIC DEVICE EMPLOYING THE METHOD

(71) Applicant: HON HAI PRECISION INDUSTRY CO., LTD., New Taipei (TW)

(72) Inventor: Jung-Yi Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 143 days.

(21) Appl. No.: 16/458,486

(22) Filed: Jul. 1, 2019

(65) Prior Publication Data

US 2020/0193240 A1 Jun. 18, 2020

(30) Foreign Application Priority Data

Dec. 13, 2018 (CN) .......................... 201811528752.X

(51) Int. Cl.
*G06K 9/62* (2006.01)

(52) U.S. Cl.
CPC .................................. *G06K 9/6267* (2013.01)

(58) Field of Classification Search
CPC ............................... G06K 9/00; G06K 9/6267
See application file for complete search history.

(56) References Cited

FOREIGN PATENT DOCUMENTS

| CN | 107145893 A | 9/2017 |
| TW | 201839665 A | 11/2018 |

*Primary Examiner* — Tuan H Nguyen
(74) *Attorney, Agent, or Firm* — ScienBiziP, P.C.

(57) ABSTRACT

A method for classifying images by applying probabilities in steps includes selecting image category corresponding to an image classifier with the first probability value top ranked from the first layer image classifier set when the first layer image classifier set cannot classify an image to be identified. A second layer image classifier set is established according to the selected image category. The method selects output of the image classifier with the largest second probability value from the second layer image classifier set as result of classification when the second probability value of at least one image classifier is greater than or equal to a second predetermined value.

20 Claims, 3 Drawing Sheets

METHOD FOR CLASSIFYING IMAGES AND ELECTRONIC DEVICE EMPLOYING THE METHOD

FIELD

The subject matter herein generally relates to image processing technology.

BACKGROUND

An image classification process includes inputting images and outputting categories of images after image classification processing. The image classification process further includes sub-category classification corresponding to the outputted image categories.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
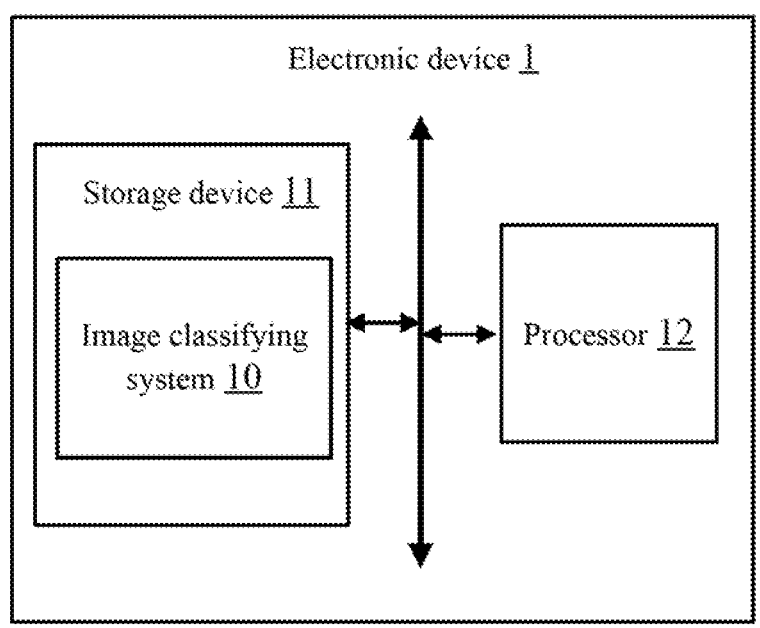
FIG. 1 is a block diagram of one embodiment of an electronic device including an image classifying system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY™, flash memory, and hard disk drives. The term "comprises" means "including, but not necessarily limited to"; it specifically indicates open-ended inclusion or membership in a so-described combination, group, series, and the like.

FIG. 1 is a block diagram of one embodiment of an electronic device. Depending on the embodiment, the electronic device 1 can include, but is not limited to, an image classifying system 10, a storage device 11, and at least one processor 12. The above components communicate with each other through a system bus.

In at least one exemplary embodiment, the storage device 11 can be an internal storage device, such as a flash memory, a random access memory (RAM) for temporary storage, and/or a read-only memory (ROM) for permanent storage. The storage device 11 can also be an external storage device, such as an external hard disk, a storage card, or a data storage medium. The at least one processor 12 can be a central processing unit (CPU), a microprocessor, or other data processor chip that performs functions of the electronic device 1.

In at least one exemplary embodiment, the electronic device 1 can be, but is not limited to, a smart phone, a tablet computer, a desktop, all-in-ones, or any other suitable electronic device. FIG. 1 illustrates only one example of the electronic device 1, other examples can comprise more or fewer components that those shown in the embodiment, or have a different configuration of the various components. For example, the electronic device 1 can further include a circuit system, input/output interface, a battery, an operating system, and so on.

Figure 2:
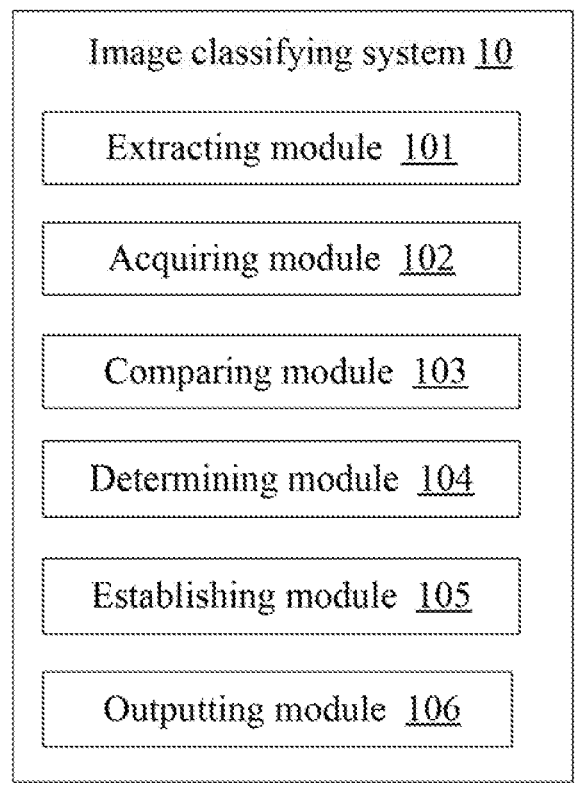
FIG. 2 is a block diagram of one embodiment of modules of the image classifying system of FIG. 1.

FIG. 2 illustrates a block diagram of one embodiment of modules of the image classifying system 10. In at least one embodiment, the image classifying system 10 can include an extracting module 101, an acquiring module 102, a comparing module 103, a determining module 104, an establishing module 105, and an outputting module 106. The modules 101-106 include computerized codes in the form of one or more programs that may be stored in the storage device 11. The computerized codes include instructions that are executed by the at least one processor 12.

In at least one exemplary embodiment, the extracting module 101 can extract characteristics from identified images. The characteristics can be features of convolution neural network (CNN).

In at least one exemplary embodiment, the identified image can be of an animal image including a cat or a dog, or the image can be of a building or other structure including a house or a store.

The CNN is a neural network parallel processor of basic neuron local connection. The basic structure of the CNN includes a feature extraction layer and a feature mapping layer. In the feature extraction layer, the input of each neuron is connected to the local receiving domain of the previous layer, and the local feature is extracted. Once the local feature is extracted, its positional relationship with other features is also determined. In the feature mapping layer, each computing layer of the network is composed of multiple feature maps, each feature map is a plane, and the weights of all neurons on the plane are equal. The feature map structure uses an activation function that affects the function kernel to give displacement invariance to the feature mapping.

In at least one exemplary embodiment, the acquiring module 102 can input the identified image to a first layer image classifier set, and output a first probability value of each image classifier of the first layer image classifier set according to the characteristics.

In at least one exemplary embodiment, the acquiring module 102 can acquire the first probability value by cosine similarity calculation method or regression function calculation method of Softmax classifier.

In at least one exemplary embodiment, the cosine similarity calculation method includes converting the characteristics to a first feature vector of the identified image and acquiring a second feature vector of each image classifier of the first layer image classifier set. An inner vector is calculated according to the first feature vector and the second feature vector and the first probability value of each image classifier based on the inner vector is acquired.

In at least one exemplary embodiment, the Softmax classifier can generalize binary logic regression to plural. The Softmax classifier can output a probability value that the identified image belongs to each image category after inputting the characteristics of the identified images. Each image classifier of the first layer image classifier set can output a first probability value that the identified image does belong to a certain image category.

In at least one exemplary embodiment, the first layer image classifier set may include several image classifiers, and each image classifiers may correspond to an image category. For example, the first layer image classifier set may include a first image classifier, a second image classifier, and a third image classifier. The first image classifier can used to recognize dog for example in the image. The second image classifier can used to recognize cat in the image. The third image classifier can used to recognize rabbit in the image.

In at least one exemplary embodiment, the comparing module 103 can determine whether the first probability value of each image classifier is greater than or equal to a first predetermined value. For example, the first predetermined value can be 0.5.

In at least one exemplary embodiment, when the first probability values of at least one image classifier of the first layer image classifier set are greater than or equal to the first predetermined value, the comparing module 103 can select the output of the image classifier with the largest first probability value as the result of classification. When the first probability value of each image classifier of the first layer image classifier set is less than the first predetermined value, the comparing module 103 can determine that the first image layer of classifier set does not recognize the image.

In at least one exemplary embodiment, the determining module 104 can arrange the first probability values in descending order, and select a predetermined number of image classifiers in which the first probability values of the predetermined number of image classifiers are top ranked. The determining module 104 further can determine the image category corresponding to the selected image classifier. For example, the first probability value of the first image classifier can be 0.47, the first probability value of the second image classifier can be 0.46, and the first probability value of the third image classifier can be 0.07. The first probability values of the first, second, and third image classifier are less than the first predetermined value. The determining module 104 can select the first image classifier and the second image classifier as the first probability values of the first and second image classifiers as top ranked. The determining module 104 further can determine the image category as corresponding to the first and second image classifiers. For example, the image category corresponding to the first image classifier is identification as dog, and the image category corresponding to the second image classifier is identification as cat.

In at least one exemplary embodiment, the establishing module 105 can establish a second layer image classifier set according to the determined image category.

In at least one exemplary embodiment, the training process of each image classifier of the second layer image classifier set is different from the training process of each image classifier of the first layer image classifier set. The image classifier of the second layer image classifier set can classify the determined image category. For example, the selected image classifier includes the first image classifier and the second image classifier, and the first image classifier recognizes dog. The establishing module 105 can establish a second layer image classifier set according to dog. The second layer image classifier set include an image classifier for recognizing poodle dog, an image classifier for recognizing bulldog, an image classifier for recognizing sheepdog, and an image classifier for recognizing Chihuahua dog. The establishing module 105 can establish another second layer image classifier set according to cat. The second layer image classifier set include an image classifier for recognizing Persian cat, blue cat of Russia, and British shorthair cat for example.

In at least one exemplary embodiment, the acquiring module 102 further can input the identified images to the second layer image classifier set, and output a second probability value of each image classifier of the second layer image classifier set according to the characteristics.

In at least one exemplary embodiment, the second probability value is different from the first probability value as the training process of each image classifier of the second layer image classifier set is different from the training process of each image classifier of the first layer image classifier set. Each image classifier in each layer of the image classifier set is trained independently. Thus the probability values are not related to each other as the identified images are processed by a different image classifier of different layers. The training process of the image classifier is prior art, and details are not described herein again.

For example, the second probability value of the image classifier for recognizing poodle dog is 0.5 when the image classifier processes the image, for recognizing bulldog is 0.2, and for recognizing sheepdog is 0.1 when the image classifier processes the image. The second probability value of the image classifier for recognizing Chihuahua dog is 0.2 when the image classifier processes the image.

The second probability value of the image classifier for recognizing Persian cat is 0.3, for recognizing blue cat of Russia is 0.4, and for recognizing British shorthair cat is 0.3 when the image classifier processes the image.

In at least one exemplary embodiment, the outputting module 106 can select the output of the image classifier with the largest second probability value as the result of classification.

In at least one exemplary embodiment, the outputting module 106 can select the output of the image classifier for recognizing poodle dog as the result. That is, the outputting module 106 can determine that the image is an image of poodle dog.

In at least one exemplary embodiment, when there are several image classifiers with the largest second probability value, the outputting module 106 can select output at random of one of the several image classifiers as the result of classification. For example, the second probability value of the image classifier for recognizing poodle dog is 0.5, and the second probability value of the image classifier for recognizing Persian cat is 0.5. The outputting module 106 can freely select either the poodle dog or the Persian cat as the result of classification.

Figure 3:
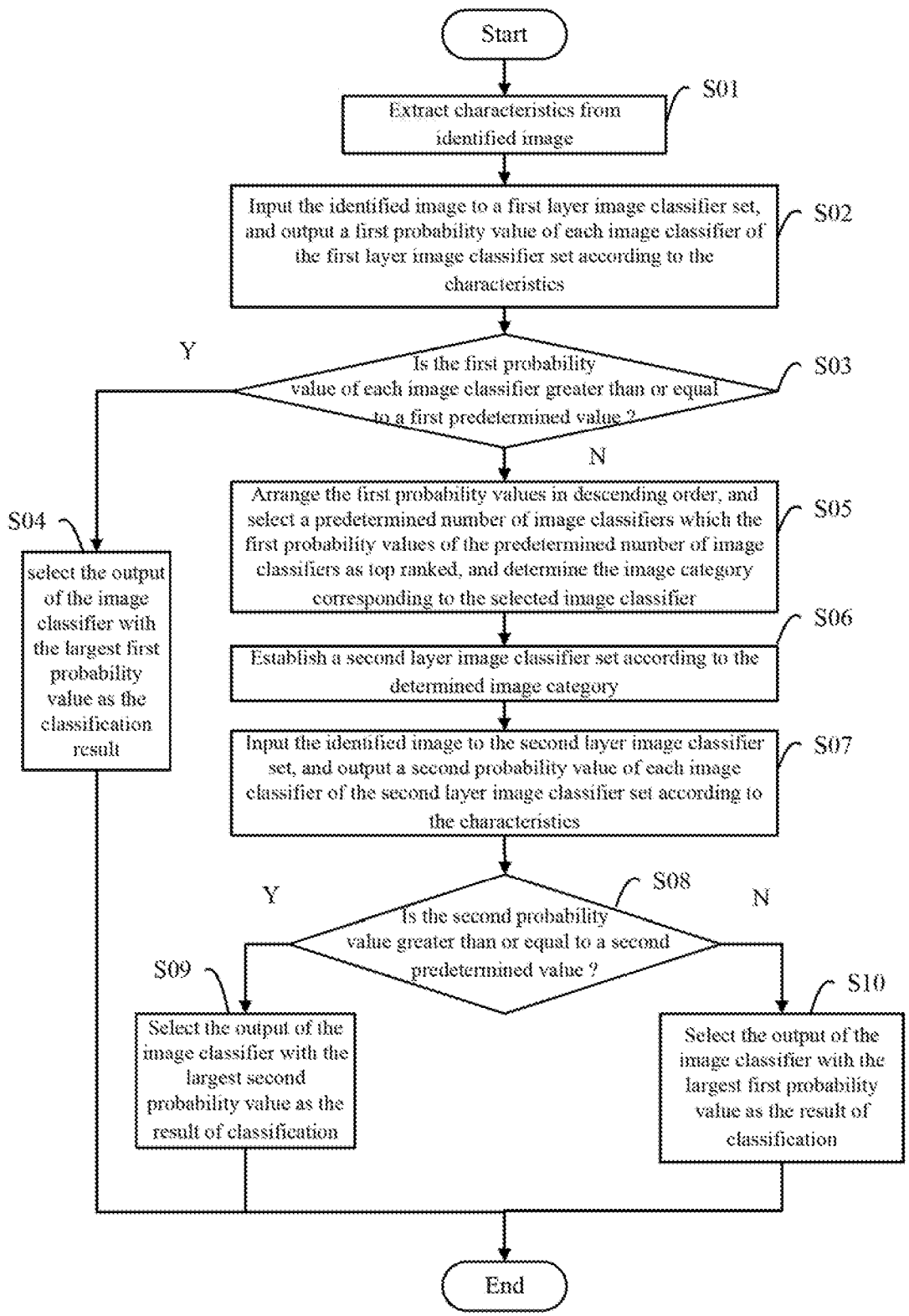
FIG. 3 illustrates a flowchart of one embodiment t of a method for classifying images using the electronic device of FIG. 1.

FIG. 3 illustrates a flowchart of a method for classifying image. In an example embodiment, the method is performed by execution of computer-readable software program codes or instructions by the processor 10 of the electronic device 1.

Referring to FIG. 3, the method is provided by way of example, as there are a variety of ways to carry out the method. The method described below can be carried out using the configurations illustrated in FIG. 2, for example, and various elements of these figures are referenced in explaining method. Each block shown in FIG. 3 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block S01.

At block S01, the extracting module 101 can extract characteristics from identified images. In at least one exemplary embodiment, the identified image can be of an animal image including a cat or a dog, or the image can be of a building or other structure including a house or a store.

At block S02, the acquiring module 102 can input the identified images to a first layer image classifier set, and output a first probability value of each image classifier of the first layer image classifier set according to the characteristics.

In at least one exemplary embodiment, the acquiring module 102 can acquire the first probability value by cosine similarity calculation method or regression function calculation method of Softmax classifier.

In at least one exemplary embodiment, the cosine similarity calculation method includes converting the characteristics to a first feature vector of the identified image and acquiring a second feature vector of each image classifier of the first layer image classifier set. An inner vector is calculated according to the first feature vector and the second feature vector and the first probability value of each image classifier based on the inner vector is acquired.

In at least one exemplary embodiment, the Softmax classifier can generalize binary logic regression to plural. The Softmax classifier can output a probability value that the identified image belongs to each image category after inputting the characteristics of the identifying image. Each image classifier of the first layer image classifier set can output a first probability value that the identified image does belong to a certain image category.

In at least one exemplary embodiment, the first layer image classifier set may include several image classifiers, and each image classifiers may correspond to an image category. For example, the first layer image classifier set may include a first image classifier, a second image classifier, and a third image classifier. The first image classifier can used to recognize dog for example in the image. The second image classifier can used to recognize cat in the image. The third image classifier can used to recognize rabbit.

At block S03, the comparing module 103 can determine whether the first probability value of each image classifier is greater than or equal to a first predetermined value. For example, the first predetermined value can be 0.5.

In at least one exemplary embodiment, when the first probability values of at least one image classifier of the first layer image classifier set are greater than or equal to the first predetermined value, the process goes to block S04. When the first probability value of each image classifier of the first layer image classifier set is less than the first predetermined value, the comparing module 103 can determine that the first image layer of classifier set does not recognize the identified images, and the process goes to block S05.

At block S04, the comparing module 103 can select the output of the image classifier with the largest first probability value as the result of classification.

At block S05, the determining module 104 can arrange the first probability values in descending order, and select a predetermined number of image classifiers which the first probability values of the predetermined number of image classifiers are top ranked, and determine the image category corresponding to the selected image classifier.

For example, the first probability value of the first image classifier can be 0.47, the first probability value of the second image classifier can be 0.46, and the first probability value of the third image classifier can be 0.07. The first probability values of the first, second, and third image classifier are less than the first predetermined value. The determining module 104 can select the first image classifier and the second image classifier as the first probability values of the first and second image classifiers as top ranked. The determining module 104 further can determine the image category as corresponding to the first and second image classifiers. For example, the image category corresponding to the first image classifier is identification as dog, and the image category corresponding to the second image classifier is identification as cat.

At block S06, the establishing module 105 can establish a second layer image classifier set according to the determined image category.

In at least one exemplary embodiment, the training process of each image classifier of the second layer image classifier set is different from the training process of each image classifier of the first layer image classifier set. The image classifier of the second layer image classifier set can classify the determined image category. For example, the selected image classifier includes the first image classifier and the second image classifier, and the first image classifier recognizes dog. The establishing module 105 can establish a second layer image classifier set according to dog. The second layer image classifier set include an image classifier for recognizing poodle dog, an image classifier for recognizing bulldog, an image classifier for recognizing sheepdog, and an image classifier for recognizing Chihuahua dog. The establishing module 105 can establish another second layer image classifier set according to cat. The second layer image classifier set include an image classifier for recognizing Persian cat, blue cat of Russia, and British shorthair cat for example.

At block S07, the acquiring module 102 further can input the identified images to the second layer image classifier set, and output a second probability value of each image classifier of the second layer image classifier set according to the characteristics.

In at least one exemplary embodiment, the second probability value is different from the first probability value as the training process of each of the image classifier of the second layer image classifier set is different from the training process of each image classifier of the first layer image classifier set. Each image classifier in each layer of the image classifier set is trained independently. Thus the probability values are not related to each other as the identifying image is processed by a different image classifier of different layers. The training process of the image classifier is prior art, and details are not described herein again.

For example, the second probability value of the image classifier for recognizing poodle dog is 0.5 when the image classifier processes the image, for recognizing bulldog is 0.2, and for recognizing sheepdog is 0.1 when the image classifier processes the image. The second probability value of the image classifier for recognizing Chihuahua dog is 0.2 when the image classifier processes the image.

The second probability value of the image classifier for recognizing Persian cat is 0.3, for recognizing blue cat of Russia is 0.4, and for recognizing British shorthair cat is 0.3 when the image classifier processes the image.

At block S08, the comparing module 103 can determine whether the second probability value of each image classifier is greater than or equal to a second predetermined value.

In at least one exemplary embodiment, when the second probability values of at least one image classifier of the second layer image classifier set are greater than or equal to the second predetermined value, the process goes to block S09. When the second probability value of each image classifier of the second layer image classifier set is less than the second predetermined value, the comparing module 103 can determine that the second image layer of classifier set cannot recognize the identified images, and the process goes to block S10.

At block S09, the outputting module 106 can select the output of the image classifier with the largest second probability value as the result of classification.

In at least one exemplary embodiment, the outputting module 106 can select the output of the image classifier for recognizing poodle dog as the result. That is, the outputting module 106 can determine that the image is an image of poodle dog.

At block S10, the outputting module 106 can select the output of the image classifier with the largest first probability value as the result of classification.

In at least one exemplary embodiment, when the second image layer of classifier set cannot recognize the identified images, it is no need to classify the identified images. Then, the outputting module 106 can select the output of the image classifier with the largest first probability value as the result of classification.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:
1. An electronic device comprising:
a storage device;
at least one processor; and
the storage device storing one or more programs that, when executed by the at least one processor, cause the at least one processor to:
extract characteristics from identified images;
output a first probability value of each image classifier of a first layer image classifier set according to the characteristics by inputting the identified images to the first layer image classifier set;
determine whether the first probability value of each image classifier is greater than or equal to a first predetermined value;
select a predetermined number of image classifiers when the first probability values of the predetermined number of image classifiers are top ranked after arranging the first probability values in descending order;
determine an image category corresponding to a plurality of selected image classifiers when the first probability value of each image classifier of the first layer image classifier set is less than the first predetermined value;
establish a second layer image classifier set according to the determined image category;
output a second probability value of each image classifier of the second layer image classifier set according to the characteristics by inputting the identified images to the second layer image classifier set;
determine whether the second probability value of each image classifier is greater than or equal to a second predetermined value; and
select output of the image classifier with a largest second probability value as a result of classification when the second probability value of at least one image classifier is greater than or equal to the second predetermined value.

2. The electronic device according to claim 1, wherein the at least one processor is further caused to:
select output of the image classifier with the largest first probability value as the result of classification when the second probability value of each image classifier is less than the second predetermined value.

3. The electronic device according to claim 1, wherein the at least one processor is further caused to:
select output of the image classifier with the largest first probability value as the result of classification when the first probability value of the image classifier is greater than or equal to the first predetermined value.

4. The electronic device according to claim 1, wherein a training process of each image classifier of the second layer image classifier set is different from a training process of each image classifier of the first layer image classifier set.

5. The electronic device according to claim 4, wherein the second probability value is different from the first probability value.

6. The electronic device according to claim 1, wherein the image classifier of the second layer image classifier set classifies the determined image category.

7. The electronic device according to claim 6, wherein the at least one processor is further caused to:
selecting an output at random of one of several image classifiers as the result of classification when there are several image classifiers with the largest second probability value.

8. An image classifying method applied in an electronic device, the method comprising:
extracting characteristics from identified images;
outputting a first probability value of each image classifier of a first layer image classifier set according to the characteristics by inputting the identified images to the first layer image classifier set;
determining whether the first probability value of each image classifier is greater than or equal to a first predetermined value;
selecting a predetermined number of image classifiers when the first probability values of the predetermined number of image classifiers are top ranked after arranging the first probability values in descending order;

determining an image category corresponding to a plurality of selected image classifiers when the first probability value of each image classifier of the first layer image classifier set is less than the first predetermined value;

establishing a second layer image classifier set according to the determined image category;

outputting a second probability value of each image classifier of the second layer image classifier set according to the characteristics by inputting the identified images to the second layer image classifier set;

determining whether the second probability value of each image classifier is greater than or equal to a second predetermined value; and selecting output of the image classifier with a largest second probability value as a result of classification when the second probability value of at least one image classifier is greater than or equal to the second predetermined value.

9. The method according to claim 8, wherein the method further comprising:

selecting output of the image classifier with the largest first probability value as the result of classification when the second probability value of each image classifier is less than the second predetermined value.

10. The method according to claim 8, wherein the method further comprising:

selecting output of the image classifier with the largest first probability value as the result of classification when the first probability value of the image classifier is greater than or equal to the first predetermined value.

11. The method according to claim 8, wherein a training process of each image classifier of the second layer image classifier set is different from a training process of each image classifier of the first layer image classifier set.

12. The method according to claim 11, wherein the second probability value is different from the first probability value.

13. The method according to claim 8, wherein the image classifier of the second layer image classifier set classifies the determined image category.

14. The method according to claim 13, wherein the method further comprising:

selecting an output at random of one of several image classifiers as the result of classification when there are several image classifiers with the largest second probability value.

15. A non-transitory storage medium having stored thereon instructions that, when executed by a processor of an electronic device, causes the processor to perform an image classifying method, the method comprising:

extracting characteristics from identified images;

outputting a first probability value of each image classifier of a first layer image classifier set according to the characteristics by inputting the identified images to the first layer image classifier set;

determining whether the first probability value of each image classifier is greater than or equal to a first predetermined value;

selecting a predetermined number of image classifiers when the first probability values of the predetermined number of image classifiers are top ranked after arranging the first probability values in descending order;

determining an image category corresponding to a plurality of selected image classifiers when the first probability value of each image classifier of the first layer image classifier set is less than the first predetermined value;

establishing a second layer image classifier set according to the determined image category;

outputting a second probability value of each image classifier of the second layer image classifier set according to the characteristics by inputting the identified images to the second layer image classifier set;

determining whether the second probability value of each image classifier is greater than or equal to a second predetermined value; and selecting output of the image classifier with a largest second probability value as a result of classification when the second probability value of at least one image classifier is greater than or equal to the second predetermined value.

16. The non-transitory storage medium according to claim 15, wherein the method further comprising:

selecting output of the image classifier with the largest first probability value as the result of classification when the second probability value of each image classifier is less than the second predetermined value.

17. The non-transitory storage medium according to claim 15, wherein the method further comprising:

selecting output of the image classifier with the largest first probability value as the result of classification when the first probability value of the image classifier is greater than or equal to the first predetermined value.

18. The non-transitory storage medium according to claim 15, wherein a training process of each image classifier of the second layer image classifier set is different from a training process of each image classifier of the first layer image classifier set.

19. The non-transitory storage medium according to claim 18, wherein the second probability value is different from the first probability value.

20. The non-transitory storage medium according to claim 15, wherein the method further comprising:

selecting an output at random of one of several image classifiers as the result of classification when there are several image classifiers with the largest second probability value.

* * * * *